United States Patent [19]

Lynch et al.

[11] Patent Number: 6,018,715

[45] Date of Patent: Jan. 25, 2000

[54] AUTOMATED TRAVEL PLANNING SYSTEM

[75] Inventors: Michael F. Lynch, Dallas; Jonathan A. Turner, Plano, both of Tex.

[73] Assignee: Electronic Data Systems Corporation, Plano, Tex.

[21] Appl. No.: 08/609,034

[22] Filed: Feb. 29, 1996

[51] Int. Cl.[7] .................................................. G06F 17/60
[52] U.S. Cl. ........................................................... 705/5
[58] Field of Search .............................. 705/6, 5; 395/900

[56] References Cited

U.S. PATENT DOCUMENTS

| | | | |
|---|---|---|---|
| 4,862,357 | 8/1989 | Ahlstrom et al. | 364/407 |
| 5,021,953 | 6/1991 | Webber et al. | 364/407 |
| 5,237,499 | 8/1993 | Garback | 364/407 |
| 5,253,166 | 10/1993 | Dettelbach et al. | 364/407 |
| 5,331,546 | 7/1994 | Webber et al. | 364/407 |
| 5,570,283 | 10/1996 | Shoolery et al. | 364/407 |

FOREIGN PATENT DOCUMENTS

| | | | |
|---|---|---|---|
| 0 690 398 A1 | 1/1996 | European Pat. Off. | G06F 17/60 |
| WO 93/10502 | 5/1993 | WIPO | G06F 15/26 |

OTHER PUBLICATIONS

Dialog file 610, Business Wire, No. 46868, "COVIA CORP: Covia Corp. introduces FOCALPOINT; First Travel Agency application of IBM Personal–System 2", 3 pages. Apr. 2, 1987.

Mary Brisson, "Covia e–mail Offers Shortcut for Agencies", Business Travel News, p. 1. Nov. 2, 1992.

Danna K. Henderson, "Computer Reservations System Plunge into the PC area. (personal computers)", Air Transport World, v. 25, n. 8. p47(6). Aug. 1988.

*Primary Examiner*—Emanuel Todd Voeltz
*Assistant Examiner*—Alexander Kalinowski
*Attorney, Agent, or Firm*—L. Joy Griebenow; Baker & Botts L.L.P.

[57] ABSTRACT

An automated travel planning system (10) is provided. The system (10) includes a database (12) which stores information relating to each individual traveler and business entity customer of a travel agency and also information relating to the travel agency itself. This information may include, for example, data concerning the frequent flyer/renter programs in which a traveler participates, smoking and seating preferences for a traveler, preferred travel vendors of a business entity, restrictions on fare classes (e.g., business or coach classes only) imposed by a business entity on its employees, and promotions available to a travel agency. When travel request information is received from a specific customer (individual and/or business entity) of the travel agency, the system automatically retrieves information relating to the customer from the database and also information relating to the travel agency. The system (10) preferably uses the retrieved information to determine a travel plan that is satisfactory to the individual customer who is traveling, the business traveler customer which employs the individual, and the travel agency.

18 Claims, 2 Drawing Sheets

AUTOMATED TRAVEL PLANNING SYSTEM

RELATED APPLICATIONS

This application is related to co-pending application Ser. No. 08/610,107, entitled Automated Systems for Identifying Alternate Low-Cost Travel Arrangements, and filed on Feb. 29, 1996; and co-pending application Ser. No. 08/618,005, entitled Automated Travel Pricing System, and filed Mar. 18, 1996. This application is also related to U.S. Pat. No. 5,839,114, entitled Automated System for Selecting an Initial Computer Reservation System, which issued on Nov. 17, 1998, from application Ser. No. 08/609,040, filed on Feb. 29, 1996.

TECHNICAL FIELD OF THE INVENTION

This invention relates generally to the field of travel reservation services, and more particularly, to an automated travel planning system and method of operation.

BACKGROUND OF THE INVENTION

When a travel agent plans specific travel arrangements in response to a customer's general itinerary, the agent must consider the interests of various parties. An individual traveler may have his or her own travel preferences, such as, for example, flying exclusively on an airline having a frequent flyer program in which the traveler participates. Similarly, if the traveler is employed by a particular business entity, that entity may have its own preferences for any travel which is work-related. For example, a corporation may limit travel expenditures to business class or tourist class rates, and/or require that its employees use only certain travel services vendors (e.g., a particular airline or hotel chain). Furthermore, a travel agency may have its own preferences as to what travel arrangements are booked for its customers. For example, an airline may provide a travel agency with a block of seats on a particular flight that are for sale exclusively by the travel agency. This practice, known as space banking, guarantees the travel agency commission on those seats. Consequently, the travel agency has an incentive to sell all seats in the block.

A travel agent is expected to resolve any differences that arise when the preferences of the various parties discussed above do not coincide. This process of resolution is inefficient because the travel agent must spend time to manually determine a travel plan that is satisfactory to all the parties. In other words, during the process of manual resolution, the travel agent is unable to serve other customers, thereby reducing the agent's productivity. Furthermore, when the traveler and the traveler's employer are both customers of the travel agency, a travel agent can be placed in the awkward position of upsetting one customer in order to satisfy another.

SUMMARY OF THE INVENTION

Accordingly, a need has arisen for an automated system which generates a recommended travel plan or policy that balances between the preferences of an individual traveler, a business entity employing the traveler, and a travel agency.

In accordance with the preferred embodiment of the present invention, an automated travel planning system is provided. The automated travel planning system includes a database which stores information relating to each individual traveler and business entity customer of a travel agency and also information relating to the travel agency itself. This information may include, for example, data about the frequent flyer/renter programs in which each traveler participates, smoking and seating preferences for the travelers, preferred travel vendors of each business entity, restrictions on fare classes (e.g., business or coach classes only) imposed by each business entity on its employees, and any promotions available to a travel agency. When travel request information is received from a specific customer (individual and/or business entity) of the travel agency, the system automatically retrieves information relating to the customer(s) from the database and also information relating to the travel agency. The system preferably uses the retrieved information to determine a travel plan or policy that is satisfactory to the individual customer who is traveling, the business entity customer which employs the individual (if applicable), and the travel agency.

An important technical advantage of the present invention is that a travel plan is automatically generated so that a travel agent does not have to spend time manually balancing between the preferences of different parties. Consequently, the agent is made more productive.

Another important technical advantage of the present invention is that a travel agent using the automated system is not required to place the preferences of one customer over another. If both the individual traveler and the business entity which employs the traveler are informed that the process is automated, neither can complain that his/her/its preferences are not being considered.

BRIEF DESCRIPTION OF THE DRAWINGS

For a better understanding of the present invention, reference may be made to the accompanying drawings, in which.

DETAILED DESCRIPTION OF THE INVENTION

Figure 1:
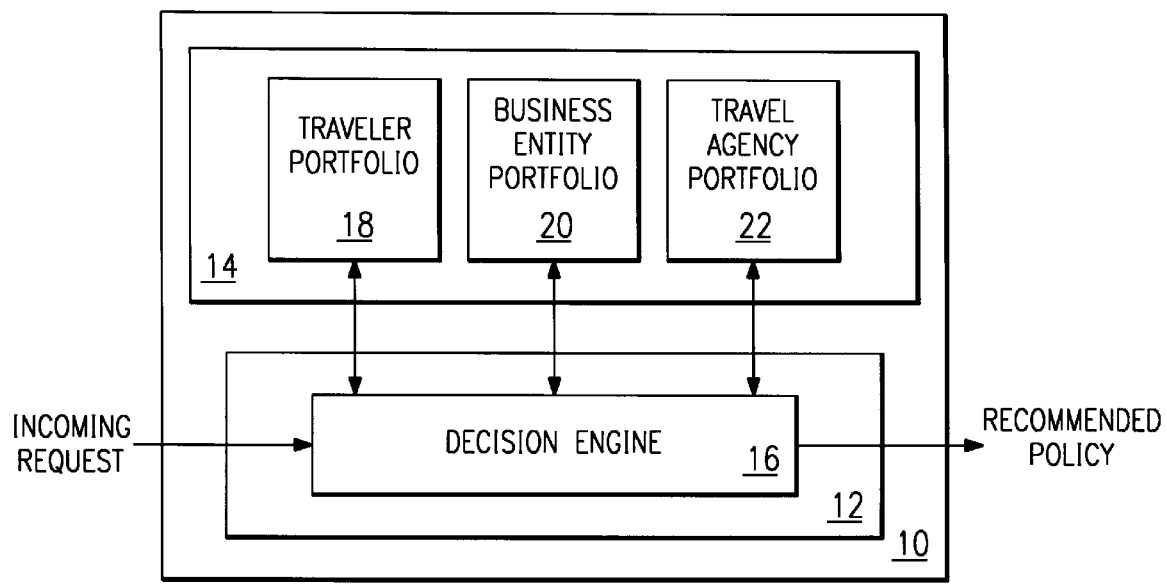
FIG. 1 is a top level block diagram of an automated travel planning system, in accordance with a preferred embodiment of the present invention.
Figure 2:
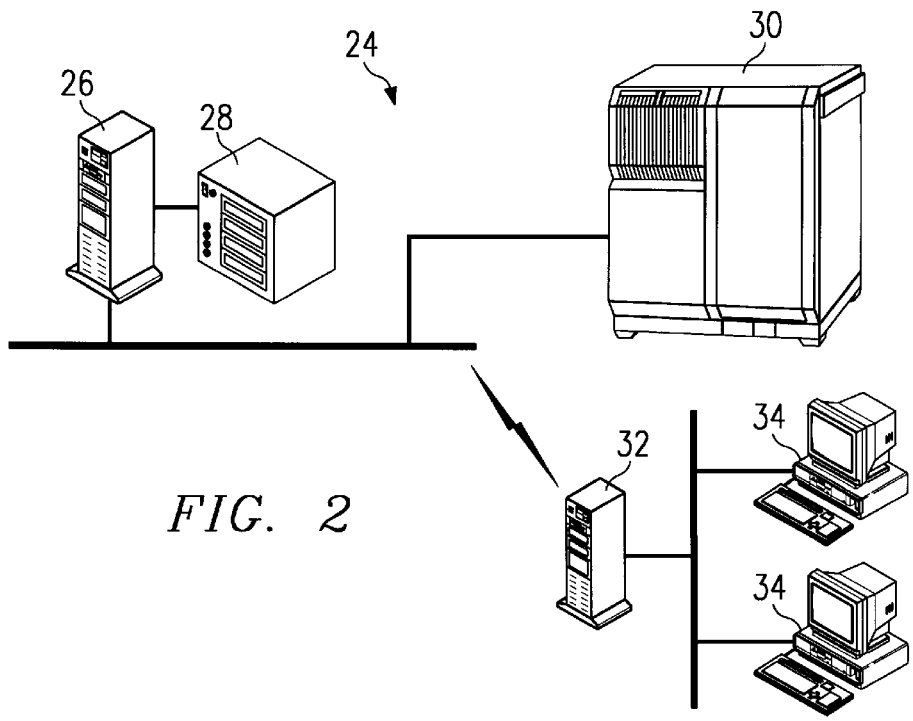
FIG. 2 is a simplified diagram of a computer-based system that can be used to implement the automated travel planning system shown in FIG. 1.
Figure 3:
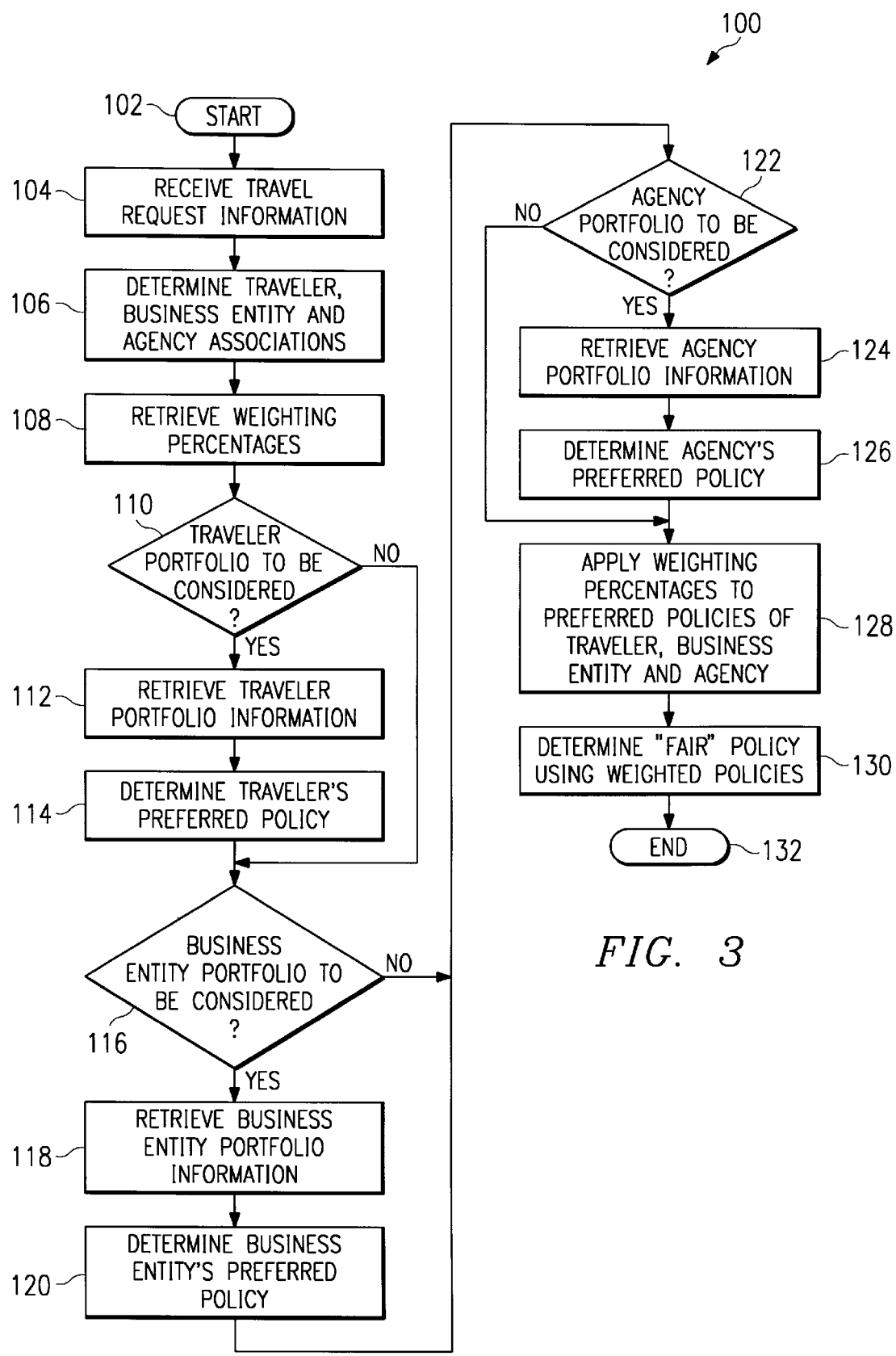
FIG. 3 is a flow diagram that illustrates a method of operating an automated travel planning system, in accordance with the preferred embodiment of the present invention.

The preferred embodiment of the present invention and its advantages are best understood by referring to FIGS. 1–3 of the drawings, like numerals being used for like and corresponding parts of the various drawings.

In accordance with the preferred embodiment of the present invention, an automated travel planning system is preferably used to generate a recommended travel plan that balances between the preferences of a traveler, a business entity which employs the traveler (if applicable), and the travel agency making arrangements for the traveler. The travel plan may include, for example, recommendations for the travel service vendor (e.g., American Airlines, Delta Airlines, or United Airlines) which should be used, the fare class of the travel arrangements (e.g., first class, business class, or coach class), seating preference (e.g., aisle or window), etc. The recommendations can then be used by a travel agent to book arrangements for the traveler. Because the travel planning system is automated, a travel agent using the system does not need to manually derive a travel plan or policy that is satisfactory to each of the traveler, the business entity, and the travel agency. Consequently, the travel agent will be able to work more productively. Furthermore, the travel agent is not placed in the awkward position of placing the preferences of one customer over another, thereby upsetting at least one customer.

FIG. 1 is a top level block diagram of an automated travel planning system 10, in accordance with the preferred embodiment of the present invention. The automated travel planning system (hereinafter, referred to as the "system") 10 includes a processing network 12 connected to a database 14.

Processing network 12 may consist of a single processor or, as described below with reference to FIG. 2, a plurality of interconnected processors. Processing network 12 functions to run one or more software applications or modules, which can include a decision engine module 16. Decision engine module 16 functions to receive travel request information, such as a travel itinerary, input into system 10 and, in response, determines a preferred travel plan for each of a traveler, a business entity employing the traveler (if applicable), and the travel agency. The decision engine module 16 can be further used to apply weighting values to each of the traveler's, the business entity's, and the travel agency's preferred travel plans. In addition, the decision engine functions to combine the weighted travel preferences to ultimately determine a recommended travel plan or policy that is "fair" to all parties. Decision engine module 16 may use fuzzy logic in its analysis. The operation of decision engine module 16 will be described below in more detail with reference to FIG. 3.

Database 14 is preferably a relational database, which resides in a data storage medium (to be described in detail below). A traveler portfolio 18 and a business entity portfolio 20 are included in the relational database 14 in system 10, for each individual traveler and business entity customer of the agency. In addition, the relational database contains a travel agency portfolio 22.

Traveler portfolio 18 contains, at a minimum, information that is used to determine an individual customer's preferred travel plan in response to any itinerary submitted by that individual. The traveler portfolio information may include, for example, the name and address of each individual customer of the travel agency, the air carriers, automobile rental agencies, or hotels preferred by each individual, frequent flier or renter programs in which the individual participates, and the seating and/or smoking preferences for each individual.

Business entity portfolio 20 contains, at a minimum, information that is used to determine a business entity customer's preferred travel plan in response to any work-related travel itinerary submitted by an employee of that business entity. Business entity portfolio information may include, for example, the name and address of each business entity customer of the travel agency, air carriers, automobile rental agencies, and hotels preferred by each business entity, special fares or discounts negotiated by each business entity with particular travel services vendors, fare class restrictions (e.g., business or coach class only) imposed by each business entity upon its employees for work-related travel, and/or maximum rates for hotel accommodations and automobile rental.

Travel agency portfolio 22 contains, at a minimum, information that is used to determine the travel agency's preferred travel plan in response to any itinerary submitted by a customer (individual and/or business entity) of the agency. This travel agency portfolio information may include, for example, the air carriers, automobile rental agencies, and hotels preferred and/or not preferred by the travel agency, a particular customer reservation system preferred by the agency, blocks of travel arrangements (e.g., airline seating on particular flights or hotel rooms on particular dates) available for sale exclusively by the agency, and promotional discounts available to the travel agency. Furthermore, the travel agency portfolio 22 may also contain the weighting values which are used by decision engine module 16 to ultimately determine a preferred travel plan. It should be noted that system 10 can be used and maintained by one or more travel agencies, in which case, travel agency portfolio 22 contains separate information for each travel agency.

System 10 receives information relating to an incoming travel request from a customer. Typically, this travel request information includes a general travel itinerary outlining various minimum parameters for travel, such as, for example, times/dates of travel and the type(s) of travel services required. In response to the travel request information, system 10 determines a recommended travel plan or policy that balances between the preferences of the individual traveler, a business entity employing the traveler (if applicable), and the travel agency. The travel plan can be used as a guideline to book travel arrangements that fall within the parameters of the travel itinerary.

FIG. 2 is a simplified diagram of an exemplary computer-based system 24 that can be used to implement the automated travel planning system 10 shown in FIG. 1. Referring to the embodiment shown in FIG. 2, the computer-based system 24 can include a process server 26, a data storage device 28, a main frame computer 30, a local file server 32, and at least one work station or desktop computer 34. Process server 26 preferably functions to process travel-related data and command information. A SUN SOLARIS 2.3 system has been successfully utilized as a process server 26. Data storage device 28 can be a mass storage subsystem of tapes and/or disk drives, which is electronically coupled to process server 26. In the preferred embodiment, a relational database resides in data storage device 28. Consequently, process server 26 may retrieve, process, and store the information in the relational database residing in data storage device 28.

The mainframe computer 30 may be linked electronically to process server 26 through a local or wide area network (LAN/WAN), for automated uploading and downloading of information therebetween. Any general purpose or medium-sized computer, which includes a central processing unit (CPU) and suitable RAM, ROM, and I/O circuitry can be utilized for mainframe 30.

Local file server 32 may be linked electronically to process server 26 by the same or a different local or wide area network, or by telecommunication lines through a modem (not explicitly shown). Additionally, as shown (for illustrative purposes only) in FIG. 2, process server 26 can be linked by a "gateway" interface communications processor to local file server 32. Local file server 32 is preferably connected to a plurality of workstations or desktop computers 34. A user of system 10, such as a travel agent, may input and receive travel-and-customer related information (including the travel plan generated by system 10), and system information, respectively, through any of the workstations 34. Preferably, each workstation 34 is a desktop computer having at least a 486 processor or an operational equivalent. Systems programming for system 10 may be performed using a high level programming language, such as $C^{++}$.

The traveler portfolio 18, the business entity portfolio 20, and the travel agency portfolio 22 (each of which contains information relating to travel preferences) are preferably stored in the relational database residing in data storage device 28. Process server 26, mainframe computer 30, local file server 32, and workstations 34 are preferably linked together. Consequently, each of these devices can directly access (e.g., store and retrieve) the travel preferences information, if necessary.

FIG. 3 is a flow diagram that illustrates a method 100 by which automated travel planning system 10 generates a recommended travel plan in response to an itinerary submitted by a customer, in accordance with the preferred embodiment of the present invention. During the steps of method 100, a user of system 10, such as a travel agent, communicates with the system, preferably via a workstation 34. For example, an agent can input system commands and travel request information by pressing appropriate keys (typing) on a workstation keyboard, or "clicking" on an option in a WINDOWS-type display. In return, the workstation 34 can display the recommended travel plan generated by system 10.

Referring to FIG. 3, at block 102, method 100 is initiated. More specifically, system 10 initiates decision engine module 16, which controls system 10 throughout the steps of method 100. At block 104, system 10 receives travel request information, which may be input by a travel agent. The travel request information can include, for example, the name of a customer (individual and/or business entity), the time and dates of travel, and the type(s) of travel services needed (e.g., airline flight, hotel, automobile rental, etc.).

At block 106, in response to the travel request information, system 10 under the control of decision engine module 16 determines the identity of the traveler, the business entity which employs the traveler (if applicable), and the travel agency of which the individual is a customer (if applicable). Preferably, if the individual for whom travel arrangements are being made is an existing customer of the travel agency, the identities of the business entity and the travel agency are accessed automatically from the relational database when the name of the individual is input into system 10. Otherwise, if the individual is a new customer, system 10 may prompt the travel agent to input information relating to the individual and his/her employer, such as, for example, the name and address of the individual, the name and address of the individual's employer, any frequent flyer or renter programs in which the individual participates, any travel services vendors preferred by the employer, etc. This individual and business entity information can be stored in database 14 for future use.

At step 108, decision engine module 16 directs system 10 to retrieve the weighting values for each of the identified parties (i.e., the traveler, the business entity, and the travel agency) from travel agency portfolio 22 in database 14. The weighting value can differ from one case to another, as will be explained below.

Although the decision engine module 16 may determine the preferred travel plans for each of the individual traveler, the business entity, and the travel agency, not all of these preferences should be considered in every case. For example, if the individual traveler is traveling for personal reasons, the preferences of his or her employer should not be considered in the travel planning.

Thus, at block 110, system 10, still under the control of decision engine module 16, queries the user to input whether the information in the traveler portfolio 18 should be considered in the process of determining a recommended travel plan. If so, at block 112, system 10 automatically retrieves the traveler portfolio information from traveler portfolio 18 in database 14. As described above, the traveler portfolio information can include the air carriers, automobile rental agencies, or hotels preferred by the traveler, frequent flier or renter programs in which the traveler participates, and the traveler's seating and/or smoking preferences.

At block 114, in response to the retrieved traveler portfolio information and the received travel request information, system 10 determines the traveler's preferred travel plan, preferably using fuzzy logic. In fuzzy logic, decision making is modeled on the kind of imprecision found (intentionally or not) in human reasoning. The "truth" of a statement or supposition may be represented on a scale of 0 to 1. A value of 1 represents completely true, a value of 0 represents completely false, and intermediate values represent varying degrees of truth. The numerical value for a degree of truth is often referred to as a "belief value" or "degree of membership" (e.g., a degree of membership of 0.7 indicates that a supposition is believed to be 70% true). Thus, for example, decision engine module 16 analyzes and converts the retrieved traveler portfolio information into fuzzy representations, such as, for example, "There is a slightly high chance that the traveler's preferred carrier will be Sunjet Airlines," or "There is a very low chance that the traveler will prefer a window seat." The decision engine module then applies a rule base to the fuzzy representations to produce one or more fuzzy solutions, which, collectively, specify a traveler's preferred travel plan. For example, one rule may stipulate: "If the chance of the predicted airline carrier being the carrier actually used is slightly high, then the predicted carrier most likely should be selected for the travel plan." Similarly, another rule may provide: "If there is a very low chance that the traveler will prefer a window seat, then an aisle seat most likely should be selected." Accordingly, if the travel request information specifies that customer J. Doe needs to fly from Atlanta to Chicago on March 2nd, and the traveler portfolio information specifies that customer J. Doe prefers to fly on Delta Airlines and sit in an aisle seat, then system 10 can determine that the customer's preferred travel plan would be an aisle seat on a Delta Airlines Flight departing from Atlanta on March 2nd and arriving in Chicago on the same day. Traffic analyzer module 18 then forwards both the results of its analysis and control of system 10 to decision engine module 20.

At block 116, system 10, still under the control of decision engine module 16, queries the user to input whether information in the business entity portfolio 20 should be considered in the process of determining a recommended travel plan. If so, at block 118, system 10 automatically retrieves (from business entity portfolio 20) the information relating to the business entity identified earlier as the traveler's employer. This business entity portfolio information may include the air carriers, automobile rental agencies, and hotels preferred by the business entity, special fares or discounts negotiated by the business entity with particular travel services providers (e.g., airlines), fare class restrictions imposed by the business entity upon its employees for work-related travel, and/or maximum rates for hotel accommodations and automobile rental.

At block 120, in response to the retrieved business entity portfolio information and the received travel request information, system 10 determines the business entity's preferred travel plan. Using the example of J. Doe discussed above, if system 10 has identified that J. Doe is employed by XYZ Company and business entity portfolio information specifies that employees of XYZ Company should fly in business class on American Airlines, then system 10 may determine that the business entity's preferred travel plan would be a business class seat on an American Airlines flight from Atlanta to Chicago.

At block 122, system 10, preferably via workstation 34, queries the user to input whether the information in travel agency portfolio 22 should be considered in the process of determining a recommended travel plan. If so, at block 124, system 10 automatically retrieves (from travel agency portfolio 22) the travel agency portfolio information for the travel agency identified earlier. The travel agency portfolio information includes air carriers, automobile rental agencies, and hotels preferred by the travel agency, a particular customer reservation system preferred by the agency, blocks of travel arrangements available for sale exclusively by the agency, and promotional discounts available to the travel agency.

At block 126, system 10, still under the control of decision engine module 16, determines the travel agency's preferred travel plan. Continuing with our example of J. Doe, if the travel agency portfolio information specifies that the travel agency has a reserved block of first-class seats on a Continental Airlines flight on March 2 between Atlanta and Chicago, then system 10 may determine that the travel agency's preferred travel plan is a first-class seat on the Continental flight.

The preferred travel plans for each of the traveler, the business entity employing the traveler, and the travel agency are output as fuzzy representations. Each fuzzy representation may have a corresponding numerical value—e.g., a fuzzy representation of "slightly high" may correspond to a value of $2/3$. Thus, for example, the individual traveler's preferred plan (i.e., aisle seat on Delta Airlines) may be have a fuzzy value of $2/3$, the business entity's preferred plan (i.e., business class on American Airlines) may have a fuzzy value of $2/3$, and the travel agency's preferred plan (i.e., first-class on Continental Airlines) may have a fuzzy value of $1/2$. Furthermore, elements within a preferred travel plan can be in fuzzy representations. For example, with reference to the individual traveler's preferred plan, the Delta Airlines element can have a fuzzy value of $3/5$.

As illustrated above in the example, the preferred travel plans of the traveler, the business entity, and the travel agency are not always the same. Consequently, at block 128, the decision engine module 16 of system 10 applies a respective weighting value to each of the fuzzy representations of the determined preferred travel plans of the traveler, the business entity, and the travel agency. Preferably, the sum of all the weighting values is equal to one (1). Thus, for example, the fuzzy representations for the individual traveler's preferred plan, the business entity's preferred plan, and the travel agency's preferred plan can be weighted with weighting values of $1/6$, $1/3$, and $1/2$, respectively. The weighting values can be applied to each preferred plan as a whole. Accordingly, the traveler's preferred plan can have a weighted fuzzy value of $1/9$ ($1/6 \times 2/3$), the business entity's preferred plan can have a value of $2/9$($1/3 \times 2/3$), and the agency's preferred plan can have a value of $1/4$($1/2 \times 1/2$). Alternately, the weighting values can be applied to each separate element of the preferred plans.

At block 130, system 10 analyzes the weighted fuzzy values to determine a travel plan that is "fair" to each of the traveler, the business entity, and the agency. If the weighting values have been applied to each preferred plan as a whole, the preferred plan having the highest weighted fuzzy value is determined to be the fair travel plan. Thus, for example, if the weighted fuzzy values for the preferred plans of the individual traveler, the business entity, and the travel agency are, respectively, $1/9$, $2/9$, and $1/4$, then the agency's preferred plan is selected because $1/4$ is greater than either $1/9$ or $2/9$. Alternatively, if the weighting values have been applied to each element of each preferred plan, the element with the highest weighted fuzzy value is selected. For example, if the American Airlines element (in the business entity's preferred travel plan), the Delta Airlines element (in the individual's preferred travel plan), and the Continental Airlines element (in the agency's preferred plan) have weighted fuzzy values of, respectively, $8/30$, $4/30$, and $3/15$, system 10 selects the American Airlines element. Each element (among corresponding elements) having the highest weighted fuzzy value is combined with the other elements having highest value to form the recommended travel plan. The recommended travel plan can then be displayed to the user of the system via workstation 34. At block 132, method 100 is terminated.

Accordingly, the present invention automatically determines a recommended travel plan that is satisfactory to each of the traveler, the business entity employing the traveler, and the travel agency. The travel plan can be used as a guideline for a travel agent to book arrangements that meet the minimum parameters of the travel itinerary specified in the travel request information. In this way, travel agents can be made more productive and are not required to choose the preference of one customer over the preference of another.

Although the present invention and its advantages have been described in detail, it should be understood that various changes, substitutions, and alterations can be made therein without departing from the spirit and scope of the invention as defined by the appended claims.

What is claimed is:

1. An automated travel planning system, comprising:
   a database operable to store traveler portfolio information comprising at least a traveler's preferences, and competing portfolio information comprising a set of competing preferences including at least a travel agency's preferences; and
   a processor connected to said database and operable to:
   receive travel request information;
   access said database to retrieve the traveler portfolio information and the competing portfolio information in response to said received travel request information;
   apply weighting values to the traveler's preferences and the competing preferences; and
   make a weighted comparison between the traveler's preferences and the competing preferences to determine a balanced travel plan.

2. The system of claim 1, wherein said processor processes fuzzy logic to determine a travel plan.

3. The system of claim 1, wherein determining a balanced travel plan comprises making a weighted comparison between the traveler's preferences and the travel agency's preferences.

4. The system of claim 1, wherein said database comprises a relational database.

5. The system of claim 1, wherein said processor comprises a file server.

6. The system of claim 1, wherein said competing portfolio information comprises business entity portfolio information, comprising at least a business entity's travel preferences.

7. The system of claim 6, wherein determining a balanced travel plan comprises making a weighted comparison between the traveler's preferences and the business entity's preferences.

8. Computer software operable to be controlled by a computer for automatically generating a travel plan, comprising:

a computer readable storage medium; and software stored on the computer readable storage medium, the software operable to:

receive travel request information;

access a database in response to said received travel request information to retrieve traveler portfolio information comprising at least a traveler's preferences, and competing portfolio information comprising a set of competing preferences including at least a travel agency's preferences;

make a weighted comparison between at least the traveler's preferences and the competing preferences to determine a balanced travel plan.

9. The system of claim 8, wherein said competing portfolio information comprises business entity portfolio information, comprising at least a business entity's travel preferences.

10. The computer software of claim 8, wherein determining a balanced travel plan comprises making a weighted comparison between the traveler's preferences and the travel agency's preferences.

11. The computer software of claim 8, wherein said competing portfolio information comprises business entity portfolio information, comprising at least a business entity's travel preferences.

12. The computer software of claim 11, wherein determining a balanced travel plan comprises making a weighted comparison between the traveler's preferences and the business entity's travel preferences.

13. A method for automatically generating a travel plan, comprising the steps of:

generating traveler portfolio information comprising at least a traveler's preferences and competing portfolio information comprising at least a set of competing preferences including at least a travel agency's preferences;

storing said traveler portfolio information and said competing portfolio information in a database;

receiving travel request information;

retrieving from said database said traveler portfolio information and said competing portfolio information in response to said received travel request information;

applying weighting values to the traveler's preferences and the competing preferences; and making a weighted comparison between at least the traveler's preferences and the competing preferences to determine a balanced travel plan.

14. The method of claim 13, wherein determining a balanced travel plan comprises making a weighted comparison between at least the traveler's preferences and the travel agency's preferences.

15. The method of claim 13, wherein said retrieving step further comprises the step of determining what information is retrieved from said database in response to said received travel request information.

16. The method of claim 13, wherein said storing step comprises storing in a relational database.

17. The method of claim 13, wherein the competing portfolio information comprises business entity portfolio information comprising at least a business entity's travel preferences.

18. The method of claim 17, wherein determining a balanced travel plan comprises making a weighted comparison between at least the traveler's preferences and the business entity's preferences.

* * * * *